United States Patent Office 3,696,061
Patented Oct. 3, 1972

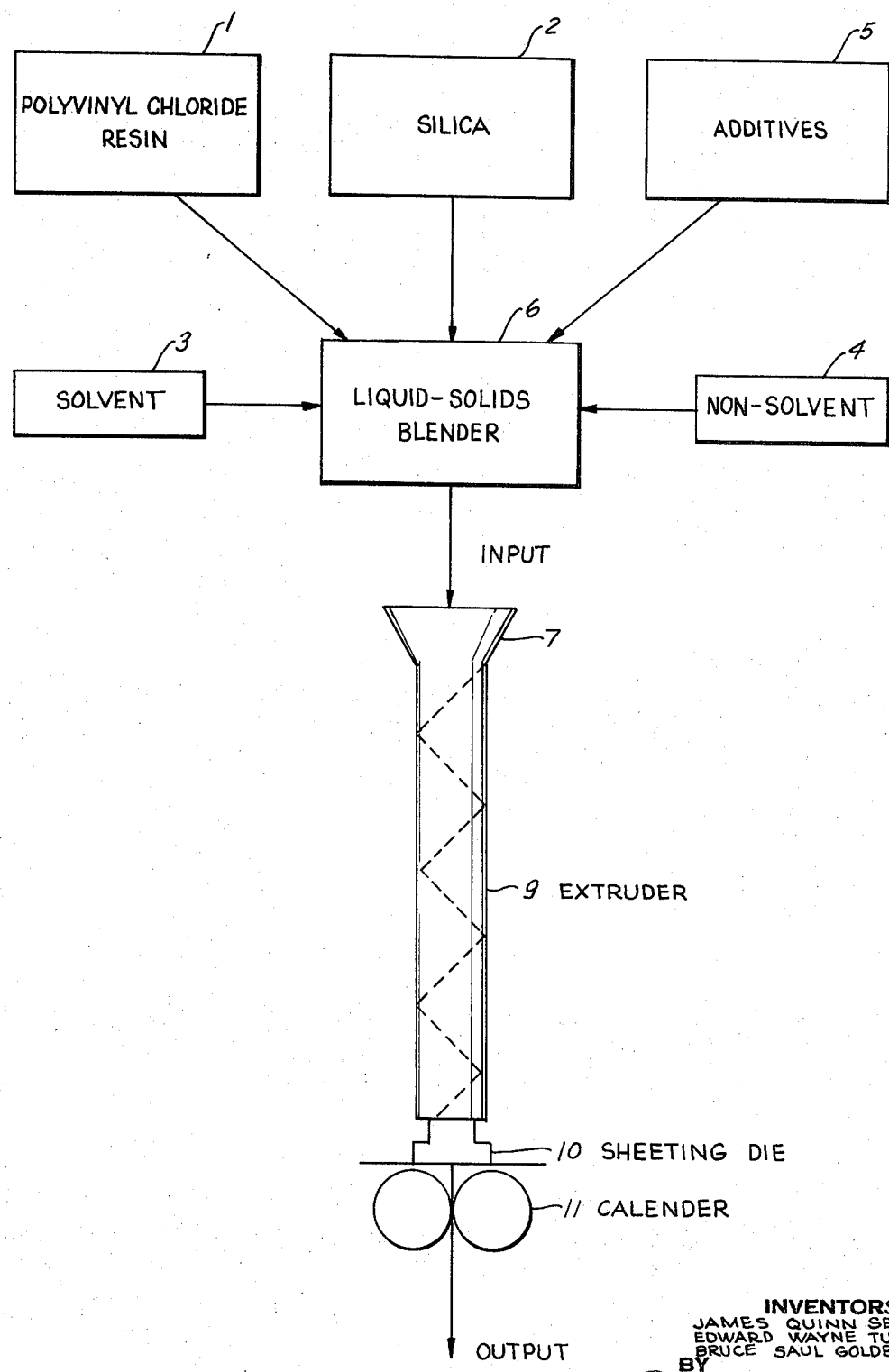

3,696,061
METHOD FOR FORMING FLOWABLE POWDER PROCESSABLE INTO MICROPOROUS OBJECT
James Quinn Selsor, Franklin Lakes, N.J., Edward Wayne Turner, Deerfield, Mass., and Bruce Saul Goldberg, Clifton, N.J., assignors to Amerace Esna Corporation, New York, N.Y.
Filed Apr. 13, 1970, Ser. No. 27,842
Int. Cl. C08f 47/08, 29/18, 45/34
U.S. Cl. 260—2.5 M                    18 Claims

ABSTRACT OF THE DISCLOSURE

Method for forming a free flowing powder blend of vinyl resins and silica by adding a volatile organic solvent to the blend at a rate below the maximum absorption rate of the silica and thereafter adding non-solvent to the mix at a rate sufficient to prevent release of the absorbed solvent.

BACKGROUND OF THE INVENTION

The invention relates to a new method for making a stable mixture capable of being processed. In particular, it relates to a new method for making a flowable powder suitable for conversion into microporous articles such as separators for electric storage batteries.

In the past, microporous articles and particularly battery separators were formed by admixing a vinyl resin and hydrous silica gel in a solids mixer, thereafter adding an organic solvent to the mixture. In the course of the mixing operation a viscous, doughly-like mass was formed. The dough was formed into a desired shape by molding, extruding or calendering. Extrusion and calendering were the preferred methods. The solvent in the formed sheet was then removed under non-evaporative conditions with respect to the nonsolvent and finished into a microporous article, for example a battery separator.

There were certain major defects in the above process. In mixing the components into the dough, high shear and heat were necessary to accomplish homogeneous dispersion of the ingredients throughout the matrix. Air tended to become entrapped in the dough causing blisters in the finished articles. Further, control of solvent/nonsolvent ratios could not be maintained because of the elevated temperatures encountered, which in turn caused non-uniformity of the porosity in the finished article.

Various mechanical problems developed in attempting to feed the dough into standard extruders. The doughy mass tended to expand in all directions when subjected to pressure and, therefore, uniform flow into the extruder was not possible. The non-uniform flow of the dough into the extruder caused pulsation in the output of the extrudate such that the physical dimensions of the formed article could not be maintained constant within desired tolerances.

From the above, it is clear that there is a need for developing a readily handled mixture which remains stable during storage, does not build up excessive frictional forces during mixing, and which is readily fed into the head of common processing machines, such as extruders and molding machines.

SUMMARY OF THE INVENTION

It is, therefore, a primary object of this invention to provide a method for forming a material which is capable of being processed, free of the defects and inadequacies of the prior art.

The above and other objects are met by forming a powder blend of a vinyl chloride resin and silica, adding an organic solvent to said powder blend with agitation at a rate less than the maximum absorption rate of said solvent of said silica and, adding the non-solvent such as water to said agitated solvent-vinyl chloride resin and silica blend at a rate sufficient to prevent release of said solvent from said silica.

As long as temperature and shear forces within the mixture are controlled, the mixture remains a damp but flowable powder, which may be stored for prolonged periods of time. It is not until the solvent/non-solvent absorbed on the silica is disrupted by external forces that the absorbed solvent is freed from the silica particles and acts to solubilize the resin thereby forming a doughy mass. A low shear mixing device is therefore preferred. The damp flowable powder produced is readily fed into conventional extruding and/or molding machines for processing into microporous articles. Since low shear forces are employed during mixing, dough-like formations are avoided. In addition, temperature rises in the present invention are not sufficient to significantly accelerate volatilization of the solvent, hence, solvent losses are minimized during mixing and/or when transferring the powder blend from the mixer to the extruder or into a storage bin.

BRIEF DESCRIPTION OF THE DRAWING

In the figure there is shown a schematic view of the process of this invention.

DESCRIPTION OF PREFERRED EMBODIMENTS

In the accompanying drawing, a typical method of manufacturing a flowable powder, capable of being processed into a microporous article such as a battery separator in accordance with the invention, is illustrated. A powder blend of solids is formed by combining a resinous vinyl chloride polymer 1 and a silica 2 within a liquid-solid blender 6 with agitation.

It has been found that co-polymers and/or emulsion or suspension polymerized vinyl chloride resins can be satisfactorily processed. Both high and low molecular weight vinyl chloride resins can be employed. If lower molecular weight resins are employed, then it is preferred that lower solvent levels be used.

It is particularly preferred that the vinyl chloride resin employed be an "EP" or "easy processing" type. An EP resin is characterized by resin particles which are porous and highly absorbent, as compared to commercial resin particles having a hard, glossy beaded appearance.

Ordinarily, the vinyl chloride polymer employed in the present invention is an unplasticized, hard, gamma vinyl chloride homopolymer resin such as that available from B. F. Goodrich Company, trademark Geon 101EP. However, the vinyl chloride polymer can be a copolymer of vinyl chloride and a small amount (for example, 15%) of a monoethylenic monomer, i.e., vinyl acetate vinylidene chloride or propylene. In such cases the preferred copolymer is a polypylene modified vinyl chloride resin such as that available from the Air Reduction Company, trademark Airco 401. A similar modification of physical properties of the resin may be achieved by mechanically admixing up to 25% by weight of a polymer such as polyvinylacetate, polypropylene, or polyacrylate.

The resin may be compounded with the usual stabilizing or other modifying ingredients 5, e.g., carbon black and lead stearate. A preferred stabilizer employed is a liquid such as dibutyl tin dilaurylmercaptide such as that available from the M & T Company, trademark Thermolite 20.

Silicas 2, having mean particle size of $0.02\mu$ to $6.0\mu$ and oil absorption (Gardner-Sward) of 100 to 500 grams oil per 100 grams of silica may be employed. The preferred silica has mean particle size of 0.045 to $0.05\mu$ and oil adsorption of 135 to 165 grams of oil per 100 grams of silica. An example of such a silica is available from PPG Industries, Incorporated, Chemical Division, trademark Hi-Sil 233.

In performing the invention, a dry powder blend is formed from the silica and vinyl chloride resin. For this purpose, a low shear solids mixer of blender 6 is employed. Generally, the vinyl chloride and silica are blended for from about 1 to 6 minutes. In general, it has been found that satisfactory results have been obtained when the dry powder blend is mixed for about three minutes. The preferred blender, a Patterson-Kelley high intensity "liquid-solids" blender, has a V-shaped cross-section. There are two loading ports on either end of the V and a discharge port at the apex of the V. Inside the outer shell is a high speed rotating agitator bar. The drive shaft for the agitators is hollow and liquids are injected through the agitators in an atomized mist. The speed of the outer shell is fixed at about 24 r.p.m. The internal agitators can be run at speeds of from about 2500 to 2100 r.p.m.

Although blending of the ingredients has been described in the environment of a V-shaped blender, nevertheless, other blenders may be employed for this purpose. Enhanced results have been obtained and, accordingly, it is preferred that the ratio of vinyl chloride resin to silica is from about 1:0.5 to 1:2.5.

A volatile organic solvent, as for example, cyclohexanone 3, is added to the powder blend at a rate less than the maximum absorption rate of the solvent on the silica.

The solvent employed should have an appreciable solvent and plasticizing action on the vinyl chloride resin. Solvents in which the vinyl chloride resin is soluble to the extent of at least 20 or 25% are acceptable. The solvent should be readily absorbed on the surface of the silica. The amount of solvent typically employed is from about 10 to 50% of the entire composition, with from about 25 to 35% being particularly preferred.

In general, organic solvents are preferred. Typical organic solvents which can be suitably employed include acetone, ethers, dimethyl formamide, orthochlorobenzene, nitrobenzene, tetrahydrofuran, and such ketones as methyl cyclohexanone, methyl ethyl ketone, and methyl isopropyl ketone.

Cyclohexanone is a particularly preferred solvent. Cyclohexanone properly plasticizes the polyvinyl chloride and is only slightly soluble in water. It has the capacity of being readily absorbed on the surface of the silica. Generally, cyclohexanone is employed at the ratio of from about 1 part silica to from 1.2 to 1.6 parts cyclohexanone. The preferred ratio is 1 part of silica to 1.3 parts of cyclohexanone.

A critical factor in the addition of the solvent to the dry powder blend of hydrated silica and vinyl chloride is the rate at which solvent is added. The rate at which the solvent is added is influenced, in part, by the rate at which the dry powder blend is agitated, the quantity of the silica in the dry powder blend, the particle size of the silica and that of the resin, and the temperature of the system. In general, as the rate of agitation increases, the rate at which the solvent may be added increases. As larger quantities of silica are employed as compared to a fixed quantity of solvent, the rate at which the solvent is added may be increased. As the particle size of the silica is decreased, the rate at which the solvent may be added is increased. In general, the converse of the above propositions is also true. The above parameters govern the absorption rate of the solvent on the silica. As long as the maximum absorption rate of solvent on the silica is not exceeded, the process proceeds normally. However, if the absorption rate is exceeded, localized areas of free solvent form and begin solubilizing the resin.

It will be obvious to those skilled in the art that by maximizing certain of the above factors, for example, employing smaller silica particles and minimizing other factors, for example, agitating at low speeds, various optimum rates of addition can be obtained.

It has been found that in most practical situations the solvent, particularly cyclohexanone, should be added to the dry powder blend over a period of about 20 minutes to ensure uniform absorption on the silica particles. If desired, the rate of addition of solvent can be extended to more than 20 minutes.

Adjustments can be made in the temperature, particle size, degree of agitation and quantity of constituents employed so that the rate of addition of solvent can be less than 20 minutes.

Thereafter, the non-solvent, 4, preferably distilled water, is added to the agitated solvent-blend mix at a rate less than the maximum absorption rate of the solvent ladened silica. The water acts to prevent the solvent from solubilizing the vinyl chloride resin prematurely.

Should there be a local saturation of water about the solvent impregnated silica particles, then the particles will preferentially absorb water and desorb solvent. Should this occur, the solvent would tend to solubilize the vinyl chloride resin and form a doughy mass.

On the other hand, it should be recognized that prior to the addition of water, the low shear forces caused by the agitation of the mixture tend to heat up the mixture. Once the solvent is absorbed on the surface of the silica, an increase in the temperature of the mixture causes desorption of solvent. In order to prevent such desorption with its aforesaid concurrent disadvantages, the water should be added at a rate high enough to counteract and nullify any abrupt rise in temperature owing to the shear forces produced by the agitation. It has been found that under normal circumstances, the total quantity of water should be added over a period of about 20 minutes at a relatively uniform rate. Two factors which can influence the rate at which the water is to be added are the particle size of the silica and the degree of agitation of the mixture. As the particle size of the silica is decreased, the rate of addition of water can be increased, owing to the greater surface area presented. Further, as the degree of agitation and/or quantity of silica employed is increased the rate of water addition may also be increased. As the above factors are reduced, the rate of water addition should also be reduced.

Generally, the quantity of water employed should be in the ratio of from about 2.0 to 3.0 parts water per 1.0 part vinyl chloride resin. In general, a 10% decrease in the parts water or solvent employed in the process of the invention is acceptable. However, generally, such a reduction in liquid content is detrimental to the physical and electrical properties of the microporous articles produced from the mixture because of the reduction of porosity and effect on fusion of the resin. A stable, damp free-flowing powder is discharged from the blender 6.

It has also been found that reversing the order of addition of the solvent and non-solvent to the powder blend resulted in the formation of a stable, damp free-flowing powder.

The free-flowing powder may be stored for convenient periods of time or converted directly into a microporous article, for example, a battery separator. During this conversion the free-flowing powder is added to the in-put end 7 of an extruder and preferably a vertical screw extruder 9, as illustrated. Within the extruder the free-flowing powder is converted, by high shear forces and elevated temperatures, into a doughy mix which is shaped by a die into a continuous sheet.

In the extruder illustrated, barrel temperatures can be from about 90° F. to 170° F. and the die temperature can range from about 70° F. to 140° F. In general, an acceptable temperature for the feed section of the barrel of the extruder is about 145° F. An extruder back pressure from about 200 to 1600 p.s.i.g. and preferably from about 400 to 500 p.s.i.g. is provided.

Other extruder designs, screws and operating conditions can be employed. The doughy mass formed inside the extruder barrel is extruded through a sheeting die 10 into the nip of calender 11 which is cooled to from about 40° F. to 60° F. The calendered sheet is placed on a transport screen and passed through an extraction bath containing water. The bath is preferably designed with a counter-current flow pattern. The temperature of the water bath can be from about 120° F. to 200° F., and preferably from 170° to 180° F. Residence time of the sheet within the extraction bath is from about 4 to 30 minutes depending upon sheet thickness, concentration gradient, temperature and the like. Within the bath, solvent is removed. The extracted microporous sheet is dried at about 150° to 300° F., depending upon web speed, air velocity, heat transfer area, humidity, and the like. Any of the conventional batch or continuous drying methods well known to those skilled in the art may be employed.

EXAMPLE I

A dry blend of 36.6 pounds of Hi-Sil 233, a silica having an average particle size of $0.05\mu$ and oil absorption of 135 g. oil/100 g. silica, and 20.4 pounds of Geon 101EP polyvinylchloride, 1.0 pound of Columbian Carbon Micronex W-6, a colorant, and 0.6 pound of lead stearate, a stabilizer, was formed in a five cubic foot Patterson-Kelley high intensity liquid-solids blender. The material was dry blended for 3 minutes. Thereafter, 44.7 pounds of cyclohexanone solvent were added over a period of about 20 minutes by means of gravity flow. After the cyclohexanone had been added, 46.7 pounds of water were added to by gravity flow over a 20 minute time period. A damp, flowable powder blend of all the ingredients was discharged from the blender. The mixture was stable and easily handled.

EXAMPLE II

A dry mix was blended according to the procedures of Example I employing 36.6 pounds of Hi-Sil 233, a silica having an average particle size of $0.05\mu$ and oil absorption of 135 g. oil/100 g. silica, 16.3 pounds of Geon 101EP polyvinylchloride, 4.1 pounds of Rohm & Haas Acryloid K120, a polyacrylate, 1.0 pound of Columbian Carbon Micronex W-6, a colorant and 0.6 pound of lead stearate, a stabilizer. The polyacrylate is commonly designated as a modifier for rigid vinyls. Thereafter, 44.7 pounds of cyclohexanone solvent was added to the dry blended mix according to the procedures of Example I. Finally, 46.7 pounds of water was added to the solvent-solids blend in the same manner as in Example I.

The flowable powder discharged from the blender was free-flowing, stable, and readily processable into a microporous article.

EXAMPLE III

A dry mix of 35.0 pounds of Hi-Sil 233, a silica having an average particle size of $0.05\mu$ and oil absorption of 135 g. oil/100 g. silica, and 25.0 pounds of Airco 401, a suspension, high molecular weight polyvinylchloride-polypropylene copolymer, 1.3 pounds of Columbian Carbon Micronex W-6 carbon black, a colorant, and 0.6 pound of Thermolite 20, a dibutyl tin dilaurylmercaptide, a stabilizer was prepared according to the procedures of Example I. Thereafter, 50.0 pounds of cyclohexanone solvent were added over a period of 20 minutes by means of a gravity flow. Finally, 50.0 pounds of water were added as described in Example I.

The flowable powder discharged from the blender was free-flowing, stable and was readily processable into a microporous article.

EXAMPLE IV

A dry mix was blended according to the procedures of Example I employing 35.0 pounds of Hi-Sil 233, a silica having an average particle size of $0.05\mu$ and oil absorption of 135 g. oil/100 g. silica, 25.0 pounds of Airco 401, 1.3 pounds of Micronex W-6, and 0.6 pound of Thermolite 20. Thereafter, 50.0 pounds of water were added by gravity flow over a 20 minute time period. Finally, 50.0 pounds of cycohexanone were added by gravity flow over about a 20 minute period.

The flowable powder discharged from the blender was free-flowing, stable and readily processable into a microporous article.

EXAMPLE V

A dry mix was blended according to the procedures of Example I employing 25.0 pounds of Johns-Manville Micro Cel E, a calcium silicate having an average particle size of $2.10\mu$ and oil absorption of 490 g. oil/100 g. silica, 27.0 pounds of Airco 401, 1.4 pounds of Godfrey L. Cabot's Sterling R carbon black, and .65 pound of Thermolite 20. Thereafter, 53.8 pounds of cyclohexanone solvent were added over a period of 20 minutes by means of a gravity flow. Finally, 53.8 pounds of water were added over a period of 20 minutes.

The flowable powder discharged from the blender was free-flowing, stable and was readily processable into a microporous article.

EXAMPLE VI

A dry mix was blended according to the procedures of Example I employing 35.0 pounds W. R. Grace Syloid 72-79, a sodium silicate having an average particle size of $4.00\mu$ and oil absorption of 220 g. oil/100 g. silica, 25.0 pounds of Airco 401, 1.3 pounds of Sterling R carbon black, and 0.6 pound of Thermolite 20. Thereafter, 50.0 pounds of cyclohexanone solvent were added over a period of 20 minutes by means of gravity flow. Finally, 50.0 pounds of water were added as described in Example I.

The flowable powder discharged from the blender was free-flowing, stable, and was readily processable into a microporous article.

EXAMPLE VII

A dry mix of 35.0 pounds of Hi-Sil 233, a silica having an average particle size of $0.05\mu$ and oil absorption of 135 g. oil/100 g. silica, and 23.5 pounds of Airco 401, 1.5 pounds of U.S.I. Chemicals' Microthene MN 754-18Y, a medium density polyethylene pulverized to 35 mesh particle size, 1.3 pounds of Micronex W-6 carbon black, and 0.6 pound of Thermolite 20 was prepared according to the procedures of Example I. Thereafter, 50.0 pounds of cyclohexanone solvent were added over a period of 20 minutes by means of a gravity flow. Finally, 50.0 pounds of water were added as described in Example I.

The flowable powder discharged from the blender was free-flowing, stable, and was readily formed into a microporous article.

EXAMPLE VIII

A dry mix of 35.0 pounds of Hi-Sil 233, a silica having an average particle size of $0.05\mu$ and oil absorption of 135 g. oil/100 g. silica, 25.0 pounds of Airco 401, 1.3 pounds of Sterling R carbon black, and 0.6 pound of Thermolite 20 was prepared according to the procedures of Example I. Thereafter, 100.0 pounds of a mixture comprising of 50.0 pounds of cyclohexanone, 50.0 pounds of water, and 0.05 pound of General Aniline and Film Corporation's Igepal CO-630, a surfactant was added over a period of 40 minutes by means of a gravity flow.

The flowable powder discharged from the blender was free-flowing, stable, and was readily processable into a microporous article.

The advantages of the present invention are apparent when compared to prior art processes for producing microporous articles. For example, in the patent issued to Witt, U.S. 2,772,322, there is disclosed a method of making a microporous vinyl chloride resin. It is disclosed that vinyl chloride resin and hydrous silica gel are mixed together and thereafter a solvent is added. It is stated that in the course of the mixing operation the solvent forms a viscous, dough-like solution of the vinyl chloride resin. The disadvantage of this process is that, in attempting to transfer the doughy mass from the mixer to the extruder, certain problems are encountered. The mass tends to clog the entrance port to the extruder. Further, it is difficult to uniformly feed the mass into the extruder such that a uniform continuous extrusion can be produced. In contrast to this process, the present invention overcomes these defects and provides a free-flowing powder which is stable on storage, easily fed into an extruder, and readily processible into a uniform sheet or the like.

Wherefore, we claim:

1. Method for forming a flowable powder suitable for processing into microporous articles comprising:
   (a) forming a powder blend of vinyl chloride resin and silica, said silica having the capacity to absorb liquids,
   (b) adding a volatile solvent to said powder blend without addition of external heat and with low shear agitation said solvent being added to said powder blend at a rate less than the maximum absorption rate of said solvent on said silica so that said solvent is completely absorbed by said silica, and
   (c) adding a non-solvating liquid to said solvent-blend mix without the addition of external heat and with low shear agitation, said non-solvating liquid being added to said solvent-blend mix at a rate less than the maximum absorption rate of the solvent laden silica thereby forming a stable, damp, free-flowing powder, said solvent being capable of plasticizing said vinyl chloride upon subsequently desorbed from said silica.

2. The method in claim 1 wherein up to three percent colorant is dry blended with the vinyl chloride resin and silica.

3. The method in claim 1 wherein up to five percent of powdered solid stabilizer is blended with the vinyl chloride resin.

4. The method in claim 1 wherein up to three percent of liquid stabilizer is blended with the vinyl chloride resin.

5. The method in claim 1 wherein the vinyl chloride resin is a copolymer of vinyl chloride monomer and an ethylenic monomer.

6. The method in claim 1 wherein the vinyl resin is an admixture of vinyl chloride resin and polyacrylate resin.

7. The method in claim 1 wherein the vinyl resin is an admixture of vinyl chloride resin and polymer derived from an α-olefin.

8. The method of claim 1 wherein said free-flowing powder is fed into an extruder.

9. Method for forming a flowable powder suitable for processing into microporous articles comprising:
   (a) forming a powder blend of vinyl chloride resin and silica, said silica having the capacity to absorb liquids,
   (b) adding a non-solvating liquid to said powder blend without the addition of external heat and with low shear agitation, said non-solvating liquid being added to said powder blend at a rate less than the maximum absorption rate of said non-solvating liquid on said silica, and
   (c) adding a volatile solvent to said powder blend, non-solvating liquid mix without the addition of external heat and with low shear agitation, said solvent being added to said powder blend, non-solvating liquid mix at a rate less than the maximum absorption rate of the non-solvating liquid laden silica so that said solvent is completely absorbed by said silica, thereby forming a stable, damp, free flowing powder, said solvent being capable of plasticizing said vinyl chloride upon subsequently being desorbed from said silica.

10. Method for forming a flowable powder suitable for processing into microporous articles comprising:
    (a) forming a powder blend of vinyl chloride resin and silica, said silica having the capacity to absorb liquids,
    (b) forming a mix of a volatile solvent and a non-solvating liquid, and
    (c) adding said solvent-non-solvating liquid mix to said blend without addition of external heat and with low shear agitation, said solvent-non-solvating liquid mix being added to said blend at a rate less than the maximum absorption rate of said solvent-non-solvating liquid mix on said silica so that said solvent is completely absorbed by said silica, thereby forming a stable, damp, free-flowing powder, said solvent being capable of plasticizing said vinyl chloride upon subsequently being desorbed from said silica.

11. The method of claim 9 wherein said free-flowing powder is fed into an extruder.

12. The method of claim 10 wherein said free-flowing powder is fed into an extruder.

13. The method of claim 1 wherein said free-flowing powder is subsequently subjected to high shear forces and/or the addition of external heat for desorbing the solvent from the silica thereby plasticizing the polyvinyl chloride.

14. The method of claim 1 wherein said free-flowing powder is subsequently fed into an extruder, said extruder desorbing said solvent from said silica to plasticize said polyvinyl chloride and forming a continuous sheet.

15. The method of claim 9 wherein said free-flowing powder is subsequently subjected to high shear forces and/or the addition of external heat for desorbing the solvent from the silica thereby plasticizing the polyvinyl chloride.

16. The method of claim 9 wherein said free-flowing powder is subsequently fed into an extruder, said extruder desorbing said solvent from said silica to plasticize said polyvinyl chloride and forming a continuous sheet.

17. The method of claim 10 wherein said free-flowing powder is subsequently subjected to high shear forces and/or the addition of external heat for desorbing the solvent from the silica thereby plasticizing the polyvinyl chloride.

18. The method of claim 10 wherein said free-flowing powder is subsequently fed into an extruder, said extruder desorbing said solvent from said silica to plasticize said polyvinyl chloride and forming a continuous sheet.

References Cited

UNITED STATES PATENTS 2,958,669  11/1960  Hoffmann _____ 260—34.2
2,772,322  11/1956  Witt et al. _____ 260—2.5 M MURRAY TILLMAN, Primary Examiner W. J. BRIGGS, SR., Assistant Examiner U.S. Cl. X.R.

136—146; 260—2.5 E, 2.5 P, 2.5 HA, 2.5 R, 32.8 R. 34.2, 41 A, 87.5 R, 92.8 A, 897, 899